Figure 1:
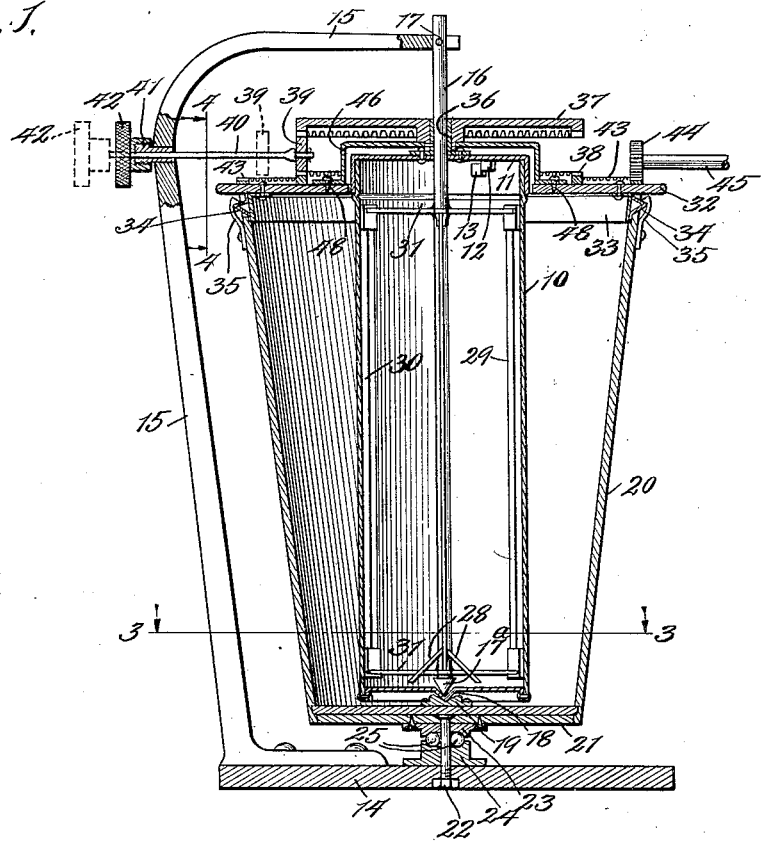

R. B. SIMPSON.
ICE CREAM FREEZER.
APPLICATION FILED MAR. 6, 1909.

1,005,342.

Patented Oct. 10, 1911.
2 SHEETS—SHEET 1.

Witnesses:

Inventor:
Roy B. Simpson
By Brown & Hopkins
Attorneys

R. B. SIMPSON.
ICE CREAM FREEZER.
APPLICATION FILED MAR. 6, 1909.
1,005,342.
Patented Oct. 10, 1911.
2 SHEETS—SHEET 2.
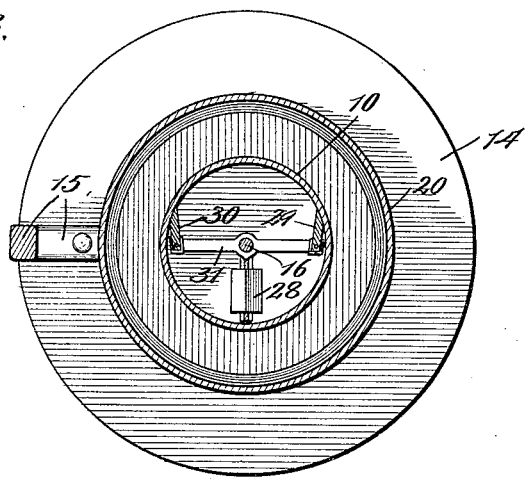
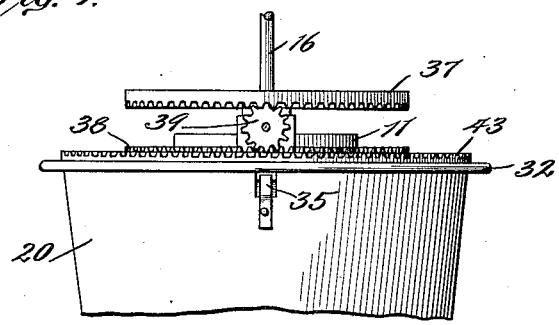
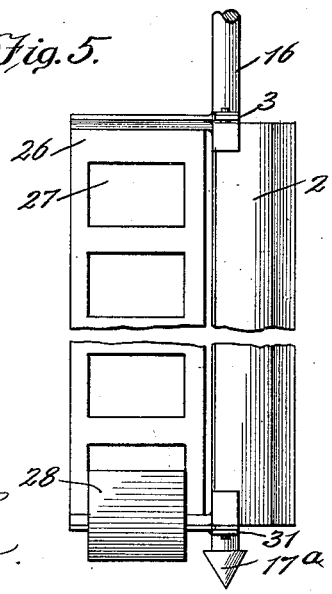
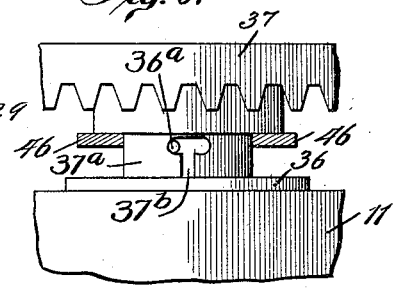
Witnesses:
Inventor:
Roy B. Simpson
By Brown & Hopkins
Attorneys

UNITED STATES PATENT OFFICE.

ROY B. SIMPSON, OF CHICAGO, ILLINOIS.

ICE-CREAM FREEZER.

1,005,342.  Specification of Letters Patent.  Patented Oct. 10, 1911.

Application filed March 6, 1909. Serial No. 481,678.

*To all whom it may concern:*

Be it known that I, ROY B. SIMPSON, a citizen of the United States, residing at Chicago, in the county of Cook and State of Illinois, have invented certain new and useful Improvements in Ice-Cream Freezers, of which the following is a full, clear, and exact specification.

The invention relates to freezers for creams, fruit ices, and the like, and the primary object is to provide an improved freezer of the class described which is capable of being operated with greater ease and efficiency than heretofore attained.

A further object is to provide an improved dasher or agitating device for the interior of the receptacle containing the material to be frozen.

A further object is to provide in a freezer of the class described an improved refrigerating chamber for containing the refrigerating materials and the receptacle containing the material to be frozen.

A still further object is to provide in a freezer of the class described improved means for imparting relative movements to the receptacle containing the material to be frozen and the refrigerating chamber, an important feature being the means employed to rotate said receptacle in the same direction in which the refrigerating chamber is rotated.

To the attainment of these ends and the accomplishment of certain other new and useful objects which will appear, the invention consists in the features of novelty hereinafter described in the specification, shown in the drawings forming a part of the specification, and pointed out more particularly in the appended claims.

Figure 2:
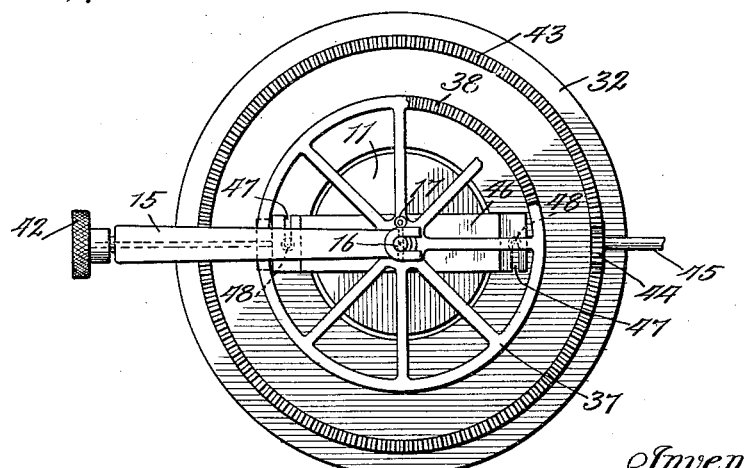

In the said drawings—Figure 1 is a view of the improved freezer in elevation, the chief parts being in section to disclose the details of construction. Fig. 2 is a plan view with a portion of the gear for driving the receptacle for containing the material to be frozen broken away. Fig. 3 is a sectional view on line 3—3 of Fig. 1, looking in the direction indicated by the arrows. Fig. 4 is a detail view on line 4—4, Fig. 1. Fig. 5 is a broken detail view of the dasher or agitator. Fig. 6 is an enlarged broken detail view of parts showing the attachment of the driving gear to the cover of the freezing chamber.

The can or receptacle for containing the material to be frozen is indicated in the drawings by the reference numeral 10, and 11 is the cover therefor, which is held in position by the member 12 secured to the cover engaging member 13 secured to the wall of the can.

A suitable base 14 is provided and to this is secured the standard 15 which supports the upper end of the dasher shaft 16, the same being secured thereto by any suitable means to prevent rotation of shaft, the preferred form being shown in which the upper end of the standard is bifurcated and the key 17 inserted through corresponding holes in the bifurcated end and in the shaft. The dasher shaft 16 extends downwardly to the bottom of the can 10, and is provided with a pointed bearing $17^a$ at its lower extremity, which fits in a corresponding socket or depressed portion in the bottom of the can, as indicated by the numeral 18. This depressed portion 18 presents a downwardly projecting surface on the bottom of the can, which engages with a suitable bearing 19 in the bottom of the freezing chamber 20. The freezing chamber 20 is rotatably mounted on base 14. This result is preferably secured by mounting a suitable circular member 21, corresponding in size with the bottom of the freezing chamber, and the circular member 21 is pivoted to base 14 by pin 22, and an anti-friction bearing secured by means of the bearing blocks 23, 24, secured to members 21 and 14 respectively, in which are provided suitable grooves or ball races which take the balls 25.

To the dasher shaft 16 an agitator blade 26 extending approximately the entire length of the can is secured. This blade is provided with a plurality of openings 27, and in the bottom thereof is secured a deflector 28 which consists of an inverted V-shaped member secured at its apex to the member 26, so that the wings or branches of it extend obliquely in opposite directions near the bottom of the can or receptacle for the materials to be frozen. To the beater shaft is also secured scrapers 29 and 30, which also extend longitudinally of the can 10 and are pivotally mounted at their extremities on the cross-supports 31. These scraper members 29 and 30 are preferably mounted as illustrated in Fig. 3, so that they are operative to engage the sides of the can in whichever direction the can may be revolved.

The bucket or freezing chamber 20 is provided with a suitable cover 32 with a circular opening in the center large enough to permit the upper end of the can 10 to project through it. This cover may be secured to freezing chamber 20 by any suitable means, but it is preferred that it be provided with a downwardly projecting flange 33 extending entirely around the cover for the purpose of forming a tight joint between the cover and the freezing chamber. The cover may be held in position on the freezing chamber by any suitable means, as, for example, the projections 34 on flange 33, which are engaged by suitable spring latches 35 on the extremity of the freezing chamber.

Rotation is imparted to the receptacle 10 for containing the freezing material through the cover 11, which has an upwardly extending sleeve 36 journaled on beater shaft 16 secured to it. Removably secured to sleeve 36 is gear wheel 37 provided with teeth on the lower face thereof and having a hub portion 37$^a$ slidable over sleeve 36 and held in operative position to rotate the sleeve by means of the bayonet joint 37$^b$ which coöperates with pin 36$^a$ on sleeve 36. On the upper side of the cover 32 of the freezing chamber there is a circular rack 38, the teeth of which extend upwardly, and this rack is of a corresponding diameter to the diameter of gear 37, in order that they may be engaged by a common pinion 39, which is rotatably mounted on the end of shaft 40, which is mounted in standard 15, being journaled in nipple 41 which is secured to the standard, and screw-threaded at its outer extremity to take the correspondingly threaded knurled thumb nut 42 which is secured to the outer extremity of the shaft 40.

In operating the device, the freezing chamber 20 which surrounds the can 10 is filled or partly filled with the usual refrigerating material, as ice and salt, and the materials to be frozen are contained in can 10. The agitating devices secured to the shaft 16 are stationary, and when the pinion 39 is in position engaging gear 37 and circular rack 38, if the refrigerating chamber or bucket 20 be rotated, the gear 37 will be caused to rotate in the opposite direction, and it will impart its rotation to the receptacle for containing the material to be frozen. The ball bearing on which the refrigerating chamber rotates decreases the friction so that it is possible to rotate the refrigerating chamber very easily.

It is usually found desirable at certain stages of the freezing process to disengage the pinion 39 from gear 37 and rack 38, which can be done by screwing off the knurled nut 42 from the nipple 41 which allows the parts to be brought to the position indicated in dotted lines in Fig. 1. When pinion 39 is thus disengaged, the can 10 containing the material to be frozen will revolve with the outer chamber 20, and a high degree of speed may be imparted to the freezer by simply grasping the rim of the cover 32 and whirling it, particularly when the freezer is constructed in the smaller sizes. It is found that this manner of operating the device at the beginning of the operation of freezing whips the cream to a dainty lightness, and increases its bulk, since the agitating devices on the beater remain stationary at all times.

When it is desired to operate the can 10 and the refrigerating chamber 20 in opposite directions, this is attained by causing the pinion 39 to engage the gear 37 and the rack 38, as described. When the pinion engages the gear and the rack, the rotation imparted to the freezing chamber 20 will cause the gear 37 and the can 10 to be rotated in opposite directions. It is not material in which direction the freezing chamber be rotated, since its rotation will cause the can 10 to rotate in the opposite direction, and the agitating devices connected with the dasher are operative in whichever direction rotation takes place. This will be apparent from an inspection of these parts as shown in Fig. 3, in which it will be seen that only one of the scrapers 29, 30 are operative at the same time, and the deflector 28 is likewise constructed so that it is operative when rotated in either direction. The deflector 28 causes a thorough intermixture of the materials to be frozen. This feature of the invention is especially desirable when the freezer is employed in freezing fruit ices, since the fruit, which has a tendency to collect at the bottom of the receptacle, is constantly deflected upwardly as the receptacle is rotated.

In order to support the chamber 20 at the top in relation to the dasher shaft 16, a bridge 46 is journaled on collar 36 which is on shaft 16, and thence extends outwardly and downwardly below the upper end of receptacle 10 so that its outer ends find a footing on the cover 32 and are provided with oppositely disposed slots 47 which engage over the screws 48 on the upper side of cover 32.

When it is desired to remove the cover 11 to inspect the interior of the receptacle 10, the bridge 46 is rotated so that its slotted ends are disengaged from the screws 48, which allows the cover, the bridge and the gear 37 to be raised by sliding the collar 36, on which they are carried, on shaft 16.

When it is desirable to apply power to the operation of the freezer, particularly in the larger sizes, it is preferred that this be accomplished by securing to the cover 32 near the outer edge thereof the circular toothed rack 43, which may be engaged by pinion 44 secured to shaft 45 driven from any desired source of power as an electric or water motor.

In order that the invention might be fully understood the details of the preferred embodiment thereof have been specifically described, but it will be apparent to those skilled in the art that many modifications may be used without departing from the purpose and spirit of the invention.

What I claim is:

1. The combination in an ice cream freezer of a base, a stationary dasher having a shaft held in position by a single standard secured to said base and having the upper portion thereof curved and extending over the top of the receptacle to support the said dasher shaft, a covered freezing chamber rotatably mounted on the base and revoluble on the axis of the dasher shaft, a receptacle for containing the material to be frozen carried within the freezing chamber and also revoluble on the said dasher shaft, means for rotating the freezing chamber, and means by which the rotation of the freezing chamber may impart rotation to the receptacle in the same direction or in the reverse direction as may be desired.

2. The combination, in an ice-cream freezer, of a rotatable freezing chamber, a rotatable receptacle for containing the material to be frozen, a gear secured to the said receptacle, a gear secured to the freezing chamber, a pinion adapted to simultaneously engage both said gears, and means for shifting the pinion whereby it may be made to engage or disengage the gears at will.

3. The combination, in an ice-cream freezer, of a base, a freezing chamber rotatably mounted on the base, a receptacle for containing the material to be frozen, rotatably mounted within the freezing chamber, a standard secured to the base and being provided at its upper extremity with a deflected portion extending over the top of the receptacle, a dasher shaft secured at its upper extremity to the standard and being provided with agitating devices within the receptacle, gears secured to the receptacle and to the freezing chamber, a pinion adapted to simultaneously engage said gears, and a shifting support on the standard for said pinion whereby it may be caused to engage or disengage the gears.

4. The combination in an ice cream freezer, of a stationary base, a rotatably mounted freezing receptacle, means for imparting rotation to said receptacle, a stationary supporting shaft, a plurality of blade supports secured to the shaft at an angle thereto, a pair of blades each provided with one or more scraping edges and being pivotally secured to the outer extremities of said blade supports in a manner to make the scraping edges operative regardless of the direction the surrounding freezing receptacle is rotated, and a deflector secured to the lower end of the dasher shaft extending at right angles to the blades and adapted to operate adjacent the bottom of the receptacle and being provided with an imperforate surface angular to the bottom of the receptacle for the purpose of deflecting materials adjacent the bottom of the receptacle upwardly when relative movement takes place between the receptacle and the dasher.

5. The combination in an ice cream freezer of a base, a stationary dasher having a shaft held in position by a single standard secured to said base and having the upper portion thereof curved and extending over the top of the receptacle to support the said dasher shaft, a covered freezing chamber rotatably mounted on the base and revoluble on a single bearing affixed to the base and in line with the axis of the dasher shaft, a receptacle for containing the material to be frozen carried within the freezing chamber and revoluble on said dasher shaft, means for rotating the freezing chamber, and means by which the rotation of the freezing chamber may impart rotation to the receptacle in the same direction or in the reverse direction as may be desired.

In testimony whereof I have signed my name to this specification, in the presence of two subscribing witnesses, on this 27th day of February A. D. 1909.

ROY B. SIMPSON.

Witnesses:
 HENRY S. PRICKETT,
 MARY D. PRICKETT.

---

Copies of this patent may be obtained for five cents each, by addressing the "Commissioner of Patents, Washington, D. C."